(12) United States Patent
Sedai et al.

(10) Patent No.: US 11,727,534 B2
(45) Date of Patent: Aug. 15, 2023

(54) NORMALIZING OCT IMAGE DATA

(71) Applicant: International Business Machines Corporation, Armonk, NY (US)

(72) Inventors: Suman Sedai, Hughesdale (AU); Stefan Renard Maetschke, Ascot Vale (AU); Bhavna Josephine Antony, Brunswick East (AU); Hsin-Hao Yu, Glen Waverley (AU); Rahil Garnavi, Macleod (AU)

(73) Assignee: International Business Machines Corporation, Armonk, NY (US)

( * ) Notice: Subject to any disclaimer, the term of this patent is extended or adjusted under 35 U.S.C. 154(b) by 254 days.

(21) Appl. No.: 17/114,924

(22) Filed: Dec. 8, 2020

(65) Prior Publication Data

US 2022/0180479 A1 Jun. 9, 2022

(51) Int. Cl.
*G06T 5/00* (2006.01)

(52) U.S. Cl.
CPC .......... *G06T 5/001* (2013.01); *G06T 2200/24* (2013.01); *G06T 2207/10101* (2013.01); *G06T 2207/20081* (2013.01); *G06T 2207/20084* (2013.01)

(58) Field of Classification Search
CPC .............. G06T 5/001; G06T 2200/24; G06T 2207/10101; G06T 2207/20081; G06T 2207/20084; G06T 11/008
See application file for complete search history.

(56) References Cited

U.S. PATENT DOCUMENTS

| | | | |
|---|---|---|---|
| 5,475,803 A | 12/1995 | Stearns | |
| 5,999,662 A | 12/1999 | Burt | |
| 7,330,270 B2 | 2/2008 | O'Hara | |
| 8,259,303 B2 | 9/2012 | Johnson | |
| 8,417,043 B2 | 4/2013 | Bocirnea | |
| 9,274,328 B2 | 3/2016 | Kaminaga | |
| 9,514,513 B2 | 12/2016 | Kim | |
| 9,978,159 B2 | 5/2018 | Kraus | |
| 11,158,094 B2 * | 10/2021 | Zhang | G06T 5/20 |
| 2014/0355856 A1 | 12/2014 | Wang | |
| 2015/0178547 A1 | 6/2015 | Bahjat | |
| 2016/0100755 A1 | 4/2016 | Chen | |
| 2016/0131774 A1 | 5/2016 | Lage | |
| 2018/0350051 A1 | 12/2018 | Boehm | |
| 2019/0333199 A1 * | 10/2019 | Ozcan | G06N 3/0454 |
| 2020/0074622 A1 | 3/2020 | Yang | |
| 2020/0250497 A1 * | 8/2020 | Peng | G06K 9/6289 |

FOREIGN PATENT DOCUMENTS

| | | |
|---|---|---|
| AU | 2003210669 B2 | 10/2009 |
| CA | 2519937 C | 11/2012 |
| WO | 2020128134 A1 | 6/2020 |
| WO | 2022121544 A1 | 6/2022 |

OTHER PUBLICATIONS

Devalla et al., "Towards Label-Free 3D Segmentation of Optical Coherence Tomography Images of the Optic Nerve Head Using Deep Learning", arXiv:2002.09635v1 [eess.IV], Feb. 25, 2020, 33 Pages.
Forte et al., "Comparison of time domain Stratus OCT and spectral domain SLO/OCT for assessment of macular thickness and volume", Eye (2009) 23, 2071-2078, Dec. 2, 2008, 8 Pages.
George et al., "Dueling Deep Q-Network for Unsupervised Inter-Frame Eye Movement Correction in Optical Coherence Tomography Volumes", arXiv:2007.01522v1 [cs.LG], Jul. 3, 2020, 8 Pages.
Halupka et al., "Retinal optical coherence tomography image enhancement via deep learning", Biomedical Optics Express 6205, vol. 9, No. 12, Dec. 1, 2018, 17 Pages.
Jog et al., "Magnetic Resonance Image Synthesis Through Patch Regression", 2013 IEEE 10th International Symposium on Biomedical Imaging: From Nano to Macro, San Francisco, California, USA, Apr. 7-11, 2013, 4 Pages.
Mahapatra et al., "Image super-resolution using progressive generative adversarial networks for medical image analysis", Computerized Medical Imaging and Graphics, Oct. 18, 2018, 23 Pages.
Mahapatra et al., "Pathological Retinal Region Segmentation from OCT Images Using Geometric Relation Based Augmentation", Proceedings of the IEEE/CVF Conference on Computer Vision and Pattern Recognition, pp. 9611-9620, 2020, 10Pages.
Rentiya et al., "Comparison of Time Domain and Spectral Domain Optical Coherence Tomography in Measurement of Macular Thickness in Macular Edema Secondary to Diabetic Retinopathy and Retinal Vein Occlusion", Hindawi Publishing Corporation, Journal of Ophthalmology, vol. 2012, Article ID 354783, Jul. 2012, 10 Pages.
Zheng et al., "Assessment of Generative Adversarial Networks Model for Synthetic Optical Coherence Tomography Images of Retinal Disorders", Translational Vision Science & Technology, 9(2), 2020, 9 Pages.
International Searching Authority, "Notification of International Search Report and Written Opinion or Declaration", International Application No. PCT/CN2021/126860, dated Feb. 8, 2022, 9 pages.

* cited by examiner

*Primary Examiner* — Ping Y Hsieh
(74) *Attorney, Agent, or Firm* — Joseph P. Curcuru

(57) ABSTRACT

In an aspect for generating device-specific OCT image, one or more processors may be configured for receiving, at a unified domain generator, first image data corresponding to OCT image scans captured by one or more OCT devices; processing, by the unified domain generator, the first image data to generate second image data corresponding to a unified representation of the OCT image scans; determining by a unified discriminator, third image data corresponding to a quality subset of the unified representation of the OCT image scans having a base resolution satisfying a first condition and a base noise type satisfying a second condition; and processing, using a conditional generator, the third image data to generate fourth image data corresponding to device-specific OCT image scans having a device-specific resolution satisfying a third condition and a device-specific noise type satisfying a fourth condition.

20 Claims, 5 Drawing Sheets

NORMALIZING OCT IMAGE DATA

BACKGROUND

The present invention relates generally to the field of image processing, and more particularly to normalizing scanner-independent optical coherence tomography (OCT) images to generate a device specific OCT scan.

Various image processing solutions employ machine learning models as deep learning networks, trained with a training set of images, to classify a particular set of images as one of the types of images that was used to train the model. A deep learning model may be configured as a Convolutional Neural Network (CNN) that is a Generative Adversarial Network (GAN) trained model or deep neural network. A GAN may include a generator network and a discriminator network used in combination to generate high resolution and low noise images.

Numerous medical facilities use countless different types of computing devices to capture and process images used during medial diagnoses. As more and more images are being upload to cloud servers and databases, those images come in different formats, resolutions, and noise types. A medical professional may find it very difficult to compare medical images captured at different medical facilities that use different image capture device technologies with medical images having different image properties captured at their resident medical facility.

SUMMARY

The present invention is described in various embodiments disclosing methods, computer program products, and computer systems for generating device-specific OCT image data. One embodiment of the present disclosure is a computer-implemented method for generating device-specific OCT image data, the computer-implemented method may include one or more processors configured for receiving, at a unified domain generator, first image data corresponding to OCT image scans captured by one or more OCT devices; processing, by the unified domain generator, the first image data to generate second image data corresponding to a unified representation of the OCT image scans. The computer-implemented method may also include one or more processors configured for determining, by a unified discriminator, third image data corresponding to a quality subset of the unified representation of the OCT image scans having a base resolution satisfying a first condition and a base noise type satisfying a second condition. The computer-implemented method may also include one or more processors configured for processing, by a conditional generator, the third image data to generate fourth image data corresponding to device-specific OCT image scans having a device-specific resolution satisfying a third condition and a device-specific noise type satisfying a fourth condition; and outputting the fourth image data to a user interface of a computing device.

In an embodiment, the computer-implemented method may include one or more processors configured for determining a resolution and a noise type for each one of the OCT image scans and determining a resolution and a noise type for each OCT device used to capture the OCT image scans.

In an embodiment, the computer-implemented method may include one or more processors configured for determining fifth image data corresponding to a device-space subset of the device-specific OCT image scans having the device-specific resolution satisfying the third condition and the device-specific noise type satisfying the fourth condition.

In an embodiment, the computer-implemented method may include one or more processors configured for training the unified discriminator using unified space image data to generate high quality normalized OCT image scans.

In an embodiment, the second image data may be determined using a convolutional neural network (CNN) generator configured to map the OCT image scans to the unified representation.

In an embodiment, the OCT image scans may be generated by OCT devices each having one of one or more resolution values and one of one or more noise type values.

In an embodiment, the first condition may be the base resolution exceeding a first predetermined threshold and the second condition is the base noise type being less than second predetermined threshold.

In an embodiment, the third condition may be the device-specific resolution being within a third predetermined threshold and the fourth condition may be the device-specific noise type is within a fourth predetermined threshold.

DETAILED DESCRIPTION

Figure 1:
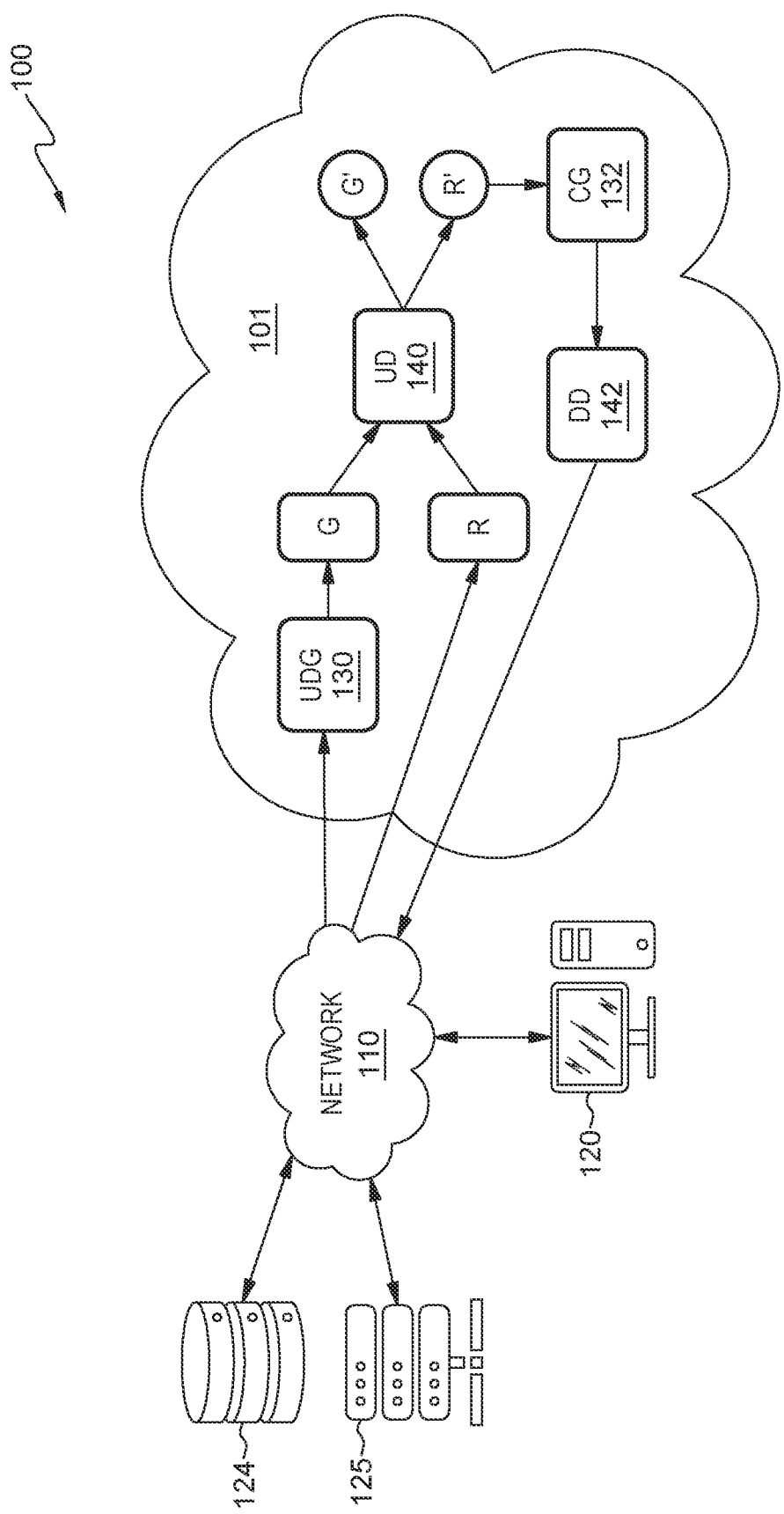
FIG. 1 depicts a block diagram of a system for generating device-specific OCT image data, in accordance with an embodiment of the present invention.

The present invention addresses the problem of comparing images of a same subject taken by different image capture devices.

Embodiments of the present invention provide a system and computer-implemented method for generating device-specific OCT image scans using machine learning models. Images captured by different OCT image capture devices have different characteristics that may significantly vary across the range of OCT image capture devices. Among the varying characteristics, resolution and noise type are the most important because the resolution and noise type determine the amount of details that medical professionals can see in the images. The computer-implemented method may be configured to transform OCT images so that the transformed images have the characteristics of another device.

In an embodiment, the method may include receiving OCT image data from different OCT image capture devices and normalizing the OCT image data to include image properties that are generally consistent throughout full set of OCT image data. Further, the method may include categorizing OCT devices by resolution and noise type, and mapping OCT image scans to a unified representation using a unified domain generator network (e.g., CNN generator). Further, the method may include selecting images that have the lowest noise level and highest resolution, wherein those selected images may represent the highest quality images from the mapped OCT image scans in the unified representation. Images may be transformed using a conditional GAN, wherein resolution and noise type are input parameters to the conditional GAN.

Further, the method may include using a discriminator as part of a GAN to distinguish between normalized and unified OCT image scans. Further, the method may include training the unified domain generator network (e.g., CNN generator) to generate high-quality normalized OCT image scans, then feeding the normalized OCT image scans into a conditional generator network that, depending on a chosen resolution and noise type, may be configured to produce or generate a device-specific OCT image scan. Embodiments of the present invention provide OCT device properties that may include, for example, axial resolution and scanning speed.

A successfully trained GAN having discriminator performance of about 50% success, and having avoided mode collapse, yields a full range of random outputs across the set of possible modes from the training data set. The generated outputs resemble but are not typically identical to training data set samples.

In an embodiment, the method utilizes cloud or edge cloud resources to train the generator and discriminator networks of the model of the GAN. After training, the GAN resides either locally or on cloud or edge cloud resources for use. In use, the GAN generates a random output according to the trained distribution function and training data set. For example, a GAN trained with images of handwritten numeric characters generates images of numeric characters that appear to be handwritten. Similarly, a GAN trained with handwritten alphabetic characters generates images of what appear to be handwritten alphabetic characters, a GAN trained with images of human faces generates images that appear to be human faces, and a GAN trained with audio files outputs a similar audio file. In each example, the GAN generates outputs according to the training rather than simply reproducing a sample from the training data set. In each example, the GAN produces output similar to, but not simply selected from, the training data set samples.

In an embodiment, the method may be configured to convert source OCT image scans into unified representations of the OCT image scans, wherein the OCT image scans may be mapped to the unified representation using a CNN generator. The method may also be configured to convert the unified representations of the OCT image scans to the target image in the desired format corresponding to a specific resolution and noise type of a specific OCT device using GANs. This enables medical professionals to compare images of the same patient that are taken in different medical facilities.

Embodiments of the present invention provide a computer-implemented method for generating device-specific OCT image data that may include one or more processors configured for receiving, at a unified domain generator, first image data corresponding to OCT image scans captured by one or more OCT devices.

In an embodiment, the computer-implemented method may include one or more processors configured for processing, by the unified domain generator, the first image data to generate second image data corresponding to a unified representation of the OCT image scans.

In an embodiment, the computer-implemented method may also include one or more processors configured for determining third image data corresponding to a quality subset of the unified representation of the OCT image scans having a base resolution satisfying a first condition and a base noise type satisfying a second condition.

The computer-implemented method may also include one or more processors configured for processing the third image data to generate fourth image data corresponding to device-specific OCT image scans having a device-specific resolution satisfying a third condition and a device-specific noise type satisfying a fourth condition.

The computer-implemented method may also include one or more processors configured for outputting the fourth image data to a user interface of a computing device.

In an embodiment, the computer-implemented method may include one or more processors configured for determining a resolution and a noise type for each one of the OCT image scans.

In an embodiment, the computer-implemented method may include one or more processors configured for determining a resolution and a noise type for each OCT device used to capture the OCT image scans.

In an embodiment, the computer-implemented method may include one or more processors configured for determining fifth image data corresponding to a device-space subset of the device-specific OCT image scans having the device-specific resolution satisfying the third condition and the device-specific noise type satisfying the fourth condition.

In an embodiment, the second image data may be determined using a convolutional neural network (CNN) generator configured to map the OCT image scans to the unified representation. The OCT image scans may be generated by OCT devices each having one of one or more resolution values and one of one or more noise type values. The first condition may be the base resolution exceeding a first predetermined threshold and the second condition is the base noise type being less than second predetermined threshold. The third condition may be the device-specific resolution being within a third predetermined threshold and the fourth condition may be the device-specific noise type is within a fourth predetermined threshold.

In an embodiment, the computer-implemented method may include one or more processors configured for training the unified discriminator using unified space image data to generate high quality normalized OCT image scans. During training, unified discriminator receives image data corresponding to images generated by unified domain generator and real images corresponding to the unified representation. The real images can include unified reference images chosen from a device that generates high quality (e.g., highest resolution and lowest noise) images. The unified discriminator may be configured to classify both generated and real image and computes a loss to penalize for incorrect classifications. Incorrect classifications may include classifying a generated image as a real image or classifying a real image as a generated image. As a result, the generator (e.g., unified domain or conditional) is trained to produce images that look like real images.

In an example scenario, a patient who has been diagnosed with glaucoma may be monitored in a first medical facility that uses a first OCT device. After two years of monitoring, the patient may change their residency to another city, and therefore has to be monitored in a second medical facility that uses a second OCT device that uses different image capture parameters (e.g., resolution, noise type) than the first OCT device. Further, a medical professional may be required to compare second OCT images captured using the second OCT device at the second medical facility with the first OCT images captured at the first medical facility using the first OCT device. Thus, the medical professional may request the first OCT images, apply the methods of this embodiment to the first OCT images to transform the first OCT images so that they appear to have been captured with the second OCT device. During transformation, the resolution and noise type of the second OCT device are used to perform the transform operation. As a result, the second medical facility may be enabled to continue to monitor the progression of the glaucoma diagnosis without an interruption in image consistency due to changing medical facilities and using different OCT image capture device parameters.

The present invention will now be described in detail with reference to the Figures.

FIG. 1 depicts a block diagram of a system 100 for generating device-specific OCT image data, in accordance with an embodiment of the present invention. FIG. 1 provides only an illustration of one embodiment of the present invention and does not imply any limitations with regard to the environments in which different embodiments may be implemented. In the depicted embodiment, system 100 includes computing device 120, server 125, database 124, unified domain generator (UDG) 130, conditional generator 132, unified discriminator 140, and device discriminator 142 interconnected over network 110. Network 110 operates as a computing network that can be, for example, a local area network (LAN), a wide area network (WAN), or a combination of the two, and can include wired, wireless, or fiber optic connections. In general, network 110 can be any combination of connections and protocols that will support communications between computing device 120, server 125, database 124, unified domain generator (UDG) 130, conditional generator 132, unified discriminator 140, and device discriminator 142. System 100 may also include additional servers, computers, sensors, or other devices not shown.

Computing device 120 operates to execute at least a part of a computer program for generating device-specific OCT image data. Computing device 120 be configured to send and/or receive data from network 110 or from any other device connected to network 110. In some embodiments, computing device 120 may be a management server, a web server, or any other electronic device or computing system capable of receiving and sending data. In some embodiments, computing device 120 may be a laptop computer, tablet computer, netbook computer, personal computer (PC), a desktop computer, a smart phone, or any programmable electronic device capable of communicating with database 124, server 125 via network 110. Computing device 120 may include components as described in further detail in FIG. 5.

Computing device 120 may also be configured to receive, store, and process images processed between unified domain generator (UDG) 130, conditional generator 132, unified discriminator 140, and device discriminator 142. Computing device 120 may be configured to store the image data in memory of computing device 120 or transmit the image data to database 124 or server 125 via network 110. The image data may be processed by one or more processors (e.g., unified domain generator (UDG) 130, conditional generator 132, unified discriminator 140, and device discriminator 142) in communication with computing device 120 or by one or more processors associated with server 125 in a cloud computing network.

Database 124 operates as a repository for data flowing to and from network 110. Examples of data include image data, OCT image data, network data, and data corresponding to images processed within system 100. A database is an organized collection of data. Database 124 can be implemented with any type of storage device capable of storing data and configuration files that can be accessed and utilized by computing device 120, such as a database server, a hard disk drive, or a flash memory. In an embodiment, database 124 is accessed by computing device 120 to store data corresponding to images processed within system 100. In another embodiment, database 124 is accessed by computing device 120 to access user data, device data, network data, and data corresponding to images processed within system 100. In another embodiment, database 124 may reside elsewhere within system 100 provided database 124 has access to network 110.

Server 125 can be a standalone computing device, a management server, a web server, or any other electronic device or computing system capable of receiving, sending, and processing data and capable of communicating with computing device 120 via network 110. In other embodiments, server 125 represents a server computing system utilizing multiple computers as a server system, such as a cloud computing environment. In yet other embodiments, server 125 represents a computing system utilizing clustered computers and components (e.g., database server computers, application server computers, etc.) that act as a single pool of seamless resources when accessed within system 100. Server 125 may include components as described in further detail in FIG. 5.

In an embodiment, system 100 for generating device-specific optical coherence tomography (OCT) image data may include one or more processors configured for receiving, at a unified domain generator (UDG) 130 (e.g., CNN generator), OCT image data (e.g., first image data) corresponding to OCT image scans captured by one or more OCT devices. Inputs to UDG 130 may include input image data corresponding to unified representation of images and OCT device parameters (e.g., resolution, noise type, noise level) of the target OCT device.

In an embodiment, system 100 may include one or more processors for processing, by UDG 130, the OCT image data (e.g., first image data) to generate unified image data (e.g., second image data) G corresponding to a unified representation of the OCT image scans. Outputs from UDG 130 may include device specific image data (e.g., output image data) corresponding to OCT images at the specified OCT device parameters.

In an embodiment, system 100 may include one or more processors for determining, by unified discriminator (UD) 140, third image data R' corresponding to a quality subset of the unified representation of the OCT image scans having a base resolution satisfying a first condition and a base noise type satisfying a second condition belonging to the unified space. For example, UD 140 may be configured to receive unified image data corresponding to a unified representation of OCT images generated by UDG 130 (e.g., second image data G) and real images R having image properties consistent with OCT device parameters of the highest quality. UD 140 may be configured to classify both generated and real images and compute a loss to penalize for incorrect classifications. Incorrect classifications may include classifying a generated image as a real image or classifying a real image as a generated image. As a result, the generator (e.g., unified domain or conditional) is trained to produce images that look like real images. The second image data may be determined using a convolutional neural network (CNN) generator configured to map the OCT image scans to the unified representation. In an embodiment, the first condition may be the base resolution exceeding a first predetermined threshold and the second condition is the base noise type being less than second predetermined threshold.

In an embodiment, system 100 may include one or more processors for processing, using conditional generator (CG) 132, the unified image data (e.g., third image data) belonging to the unified space, to generate device specific image data (not shown) (e.g., fourth image data) corresponding to device-specific OCT image scans having a device-specific resolution satisfying a third condition and a device-specific noise type satisfying a fourth condition. For example, inputs to CG 132 may include unified image data corresponding to images in unified representation and OCT device parameters (e.g., resolution, noise type, noise level) of a target OCT device. Outputs from CG 132 may include device-specific image data corresponding to OCT images at the specified OCT device parameters. Conditioning on the OCT device parameters enables CG 132 to generate OCT images with an arbitrary resolution, noise type, and noise level.

In an embodiment, system 100 may include one or more processors configured for determining OCT device parameters (e.g., a resolution, a noise type, a noise level) for each one of the OCT image scans. For example, OCT device parameters may be determined during the training phase, wherein the OCT device parameters come from the target OCT device for which OCT images are being generated for comparison. During the testing phase, discriminators may not be needed. However, a user can choose the target device type, resolution, noise type, and noise level, and system 100 may be configured to execute a computer-implemented method, as described in FIG. 4, sequentially to obtain the result. For example, a user associated with computing device 120 may interact with user interface of computing device 120 to enter OCT device parameters (e.g., resolution, noise type, nose level) for further processing. In another embodiment, the OCT device parameters may be determined based on image data received from the OCT device, wherein the image data may be processed to identify the resolution, noise type, and noise level.

In an embodiment, system 100 may include one or more processors configured for determining a resolution and a noise type for each OCT device used to capture the OCT image scans.

In an embodiment, system 100 may include one or more processors configured for determining fifth image data corresponding a device-space subset of the device-specific OCT image scans having the device-specific resolution satisfying the third condition and the device-specific noise type satisfying the fourth condition. In an embodiment, the OCT image scans may be generated by OCT devices each having one of one or more resolution values and one of one or more noise type values.

In an embodiment, the third condition may be the device-specific resolution being within a third predetermined threshold and the fourth condition may be the device-specific noise type is within a fourth predetermined threshold.

In an embodiment, system 100 may include one or more processors configured for training the unified discriminator using unified space image data to generate high quality normalized OCT image scans.

In an embodiment, system 100 may include one or more processors for outputting the fourth image data to a user interface of computing device 120. Further, any data received, processed, or generated within system 100 may be output to a user interface of computing device 120 at any stage during the implemented of the described embodiments.

FIG. 1 provides a schematic illustration of a GAN 101, according to an embodiment of the invention. As shown in the figure, the unified domain generator (UDG) 130 may be configured to generate an output G, according to image data received from network 110 used to train UDG 130.

GAN 101 may be configured to provide G and real output R to unified discriminator (UD) 140 for consideration. UD 140 may be configured to consider each input in turn and classifies the input as either real R, or fake/generated G. A well-trained GAN generates outputs from its noise input vector which the discriminator classifies as real 50% of the time. GAN 101 may be run on a server computing system utilizing multiple computers as a server system, such as a cloud computing environment. In yet other embodiments, GAN 101 could be run on a computing system utilizing clustered computers and components (e.g., database server computers, application server computers, etc.) that act as a single pool of seamless resources when accessed within system 100.

Figure 2:
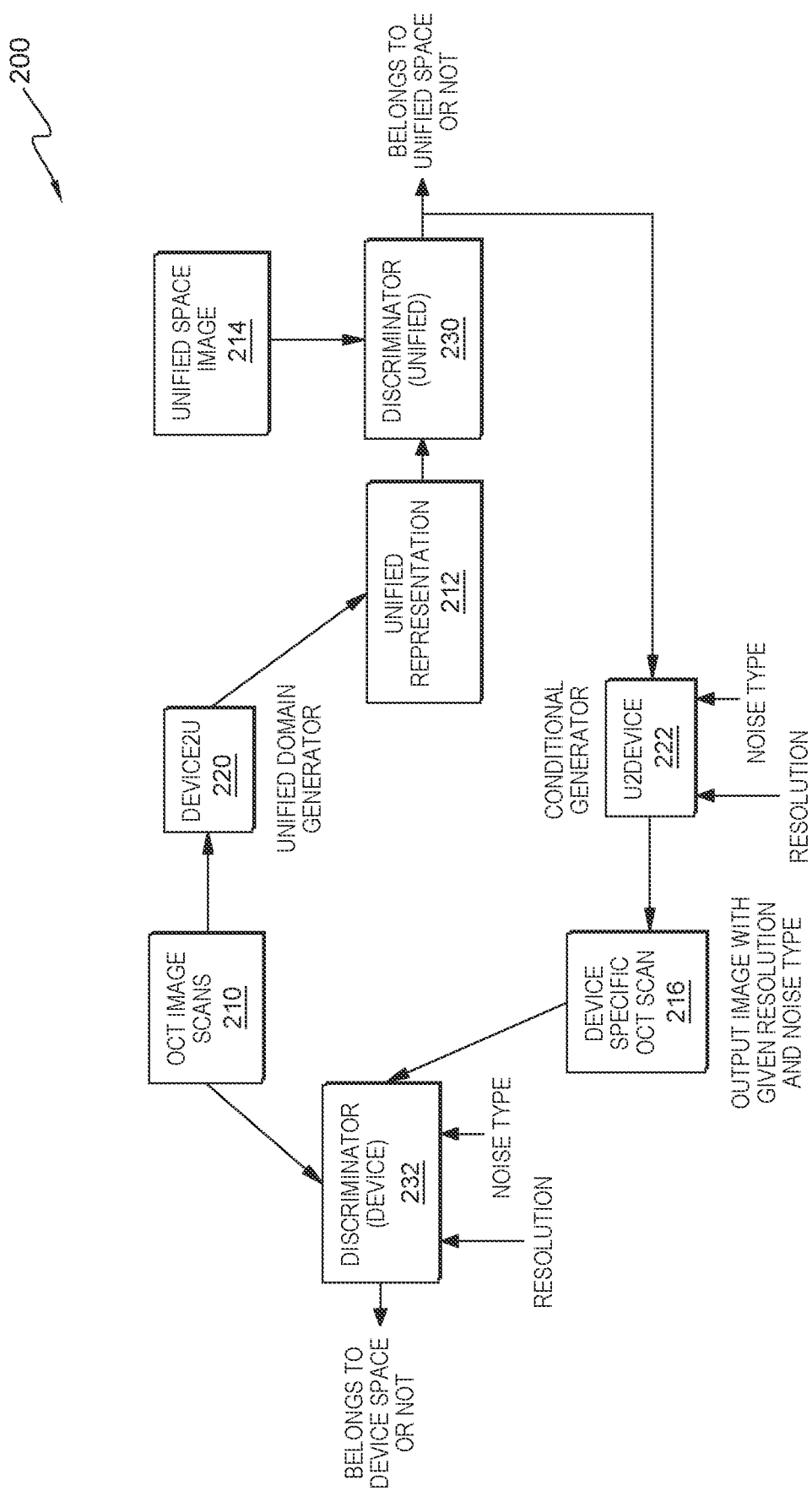
FIG. 2 depicts a block diagram of a model for generating device-specific OCT image data, in accordance with an embodiment of the present invention.

While the foregoing describes, and FIG. 2 illustrates, implementation of a GAN model (e.g., Unified Domain Generator 220 with Unified Discriminator 230, Conditional Generator 222 with Device Discriminator 232), the present disclosure is not limited thereto. In at least some embodiments, model 200 may implement a trained component or trained model configured to perform the processes described above with respect to model 200. The trained component may include one or more machine learning models, including but not limited to, one or more classifiers, one or more neural networks, one or more probabilistic graphs, one or more decision trees, and others. In other embodiments, the trained component may include a rules-based engine, one or more statistical-based algorithms, one or more mapping functions or other types of functions/algorithms to determine whether a natural language input is a complex or non-complex natural language input. In some embodiments, the trained component may be configured to perform binary classification, where the natural language input may be classified into one of two classes/categories. In some embodiments, the trained component may be configured to perform multiclass or multinomial classification, where the natural language input may be classified into one of three or more classes/categories. In some embodiments, the trained component may be configured to perform multi-label classification, where the natural language input may be associated with more than one class/category.

Various machine learning techniques may be used to train and operate trained components to perform various processes described herein. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

FIG. 2 depicts a block diagram of model 200 for generating device-specific OCT image data, in accordance with an embodiment of the present invention. Model 200 illustrates a block processing model including GAN 101 shown in in FIG. 1 components receiving image data at particular stages and user inputs at various stages, wherein the user inputs include OCT device specific parameters (e.g., resolution, noise type). Model 200 may include unified domain generator 220 configured to receive image data (e.g., OCT image scans 210). Unified domain generator 220 may be configured to receive multiple input images and produce model output data (e.g., unified representation 212) as feature vectors corresponding to each image and transmit the model output data to a series of fully connected layers. The output data from the fully connected layers may be representative of a classification for a full study. This model output data may be in the form of a confidence score or probability for each classification. In an embodiment, OCT device parameters (e.g., resolution, noise type, noise level) may be provided to model 200 as part of model input data or separately on different channel inputs.

In an embodiment, OCT image scans 210 may be provided to UDG 220 (e.g., Device2U) to produce a unified representation 212 (e.g., unified image data) of OCT image scans 210. Unified representation 212 may include image data having a resolution that exceeds a predetermined threshold and a noise level that is below a predetermined threshold representative of a good quality image.

In an embodiment, input image data represented as unified representation 212 and unified space image 214 may be provided to unified discriminator 230 to distinguish between generated unified images (e.g., unified representation 212) and real unified images (e.g., unified space image 214). Unified discriminator 230 may be configured to generate output data corresponding to a classification of whether or not the input image data belongs to the unified space or not. The output data may be transmitted to computing device 120 via network 110 for processing and display on a user interface of computing device 120.

In an embodiment, unified representation 212 that belongs to the unified space may be provided as input image data to conditional generator 222 (e.g., U2Device) along with a noise type and resolution of a specific OCT device to generate output image data including device specific OCT scan 216. Conditional generator 222 may be configured to receive image data in the unified space and produce image data having properties corresponding to the particular device of the given resolution and noise type.

In an embodiment, device discriminator 232 may be configured to receive input image data represented as device specific OCT scan 216 along with a noise type and resolution of a specific OCT device to generate output image data corresponding to a classification of whether or not the input image data belongs to a device space or not. In a test phase, a user can choose the target OCT device type, resolution, and noise type and model 200 may be configured to execute the modules sequentially to obtain the result.

Figure 3:
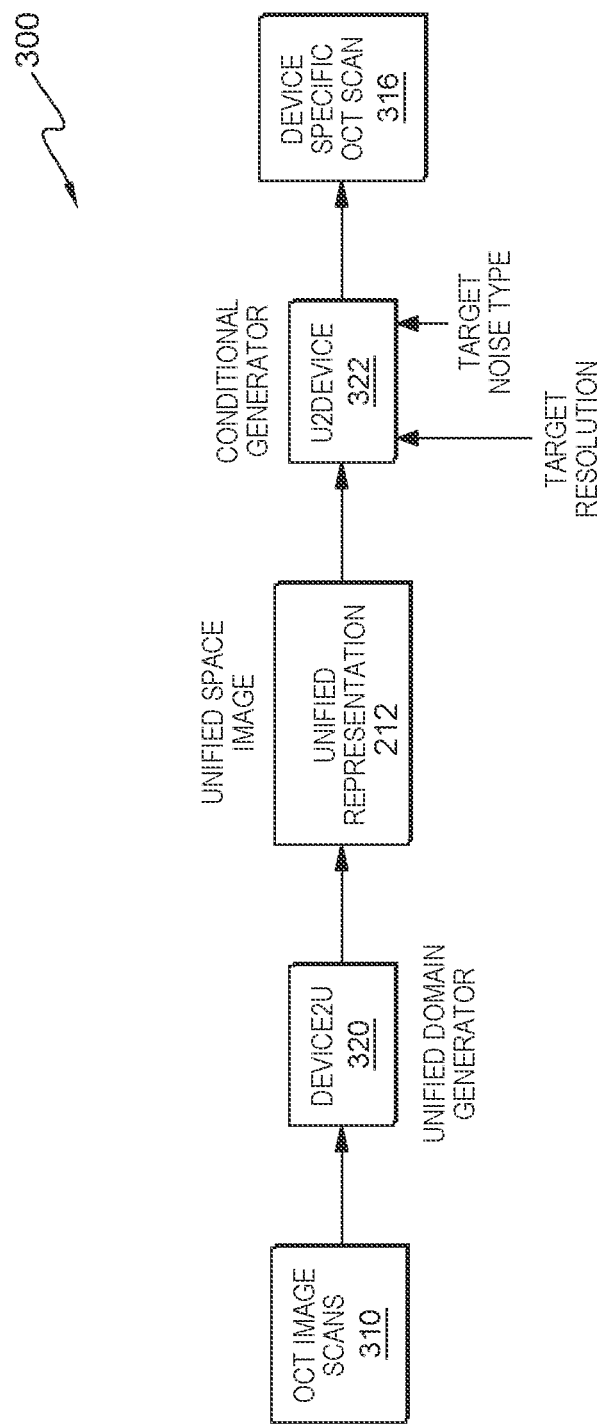
FIG. 3 depicts a block diagram of a training model for generating device-specific OCT image data, in accordance with an embodiment of the present invention.

FIG. 3 depicts a block diagram of a training model 300 for generating device-specific OCT image data, in accordance with an embodiment of the present invention.

In an embodiment, model 300 may undergo a testing phase where a target device type and respective target device parameters may be selected. Once selected, model 300 may be configured to execute steps of model 300 sequentially to obtain OCT images generated according to specific device parameters. For example, OCT image scans 310 may be provided to Unified Domain Generator (UDG) 320 (depicted as Device2U) to generate image data corresponding to a unified representation 212 of OCT image scans 310. Image data corresponding to the unified representation of OCT image scans 310 may be provided to Conditional Generator (CG) 322, which when processed along with a target resolution and a target noise type, may be configured to generate image data corresponding to device specific OCT image 316.

In an embodiment, during the training phase, OCT device parameters may be determined by examining the settings of the target OCT device. OCT device parameters may include resolution, noise type, and noise level.

Figure 4:
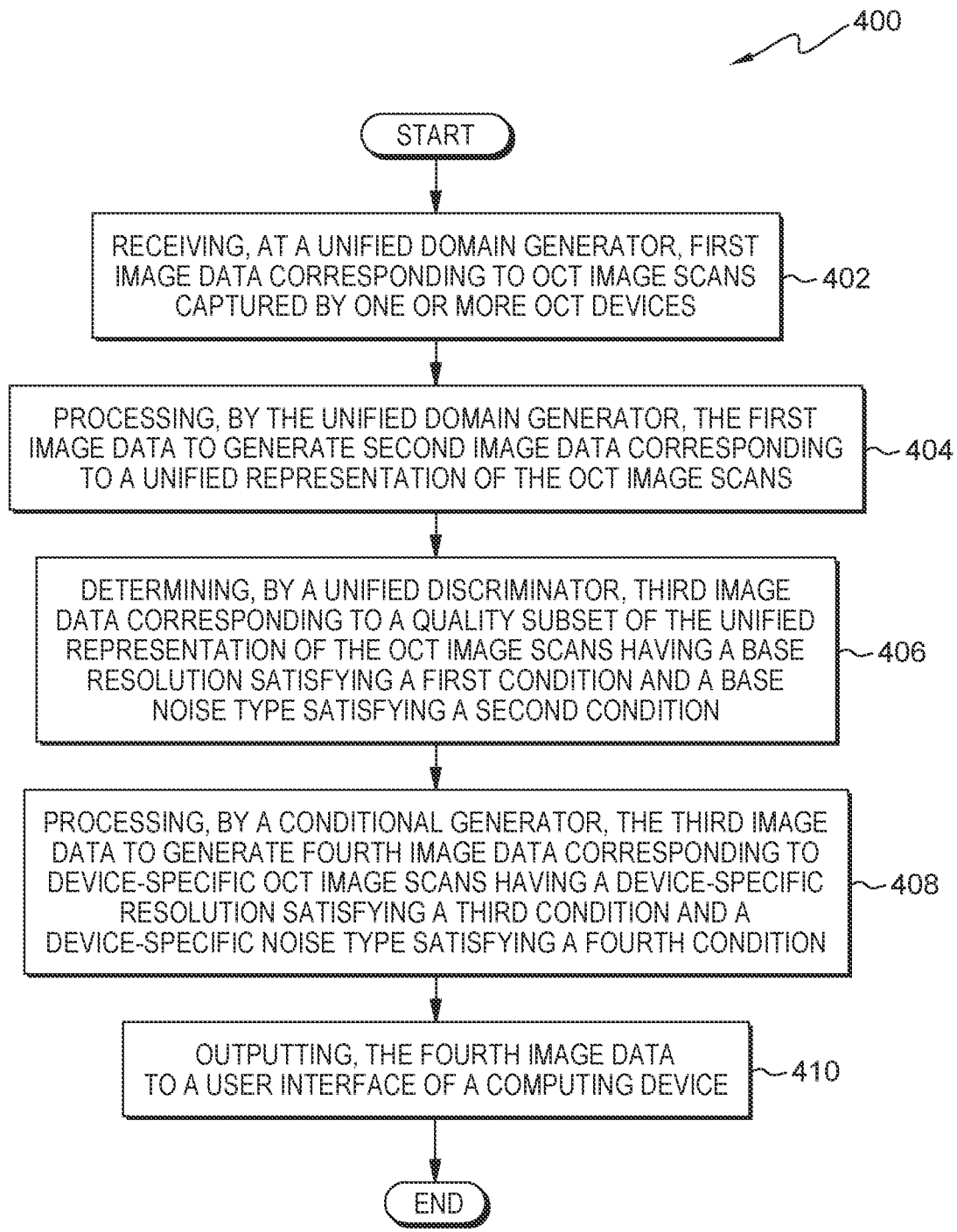
FIG. 4 depicts a flow chart of a computer-implemented method for generating device-specific OCT image data, in accordance with an embodiment of the present invention.

FIG. 4 depicts a flow chart of a computer-implemented method 400 for generating device-specific OCT image scans, in accordance with an embodiment of the present invention.

Embodiments of the present invention provide computer-implemented method 400 for generating device-specific OCT image data that may include one or more processors configured for receiving 402, at a unified domain generator, first image data corresponding to OCT image scans captured by one or more OCT devices. In an embodiment, computer-implemented method 400 may include one or more processors configured for determining a resolution and a noise type for each one of the OCT image scans. In an embodiment, computer-implemented method 400 may include one or more processors configured for determining a resolution and a noise type for each OCT device used to capture the OCT image scans.

In an embodiment, computer-implemented method 400 may include one or more processors configured for processing 404, by the unified domain generator, the first image data to generate second image data corresponding to a unified representation of the OCT image scans. In an embodiment, the OCT image scans may be generated by OCT devices each having one of one or more resolution values and one of one or more noise type values. In an embodiment, the second image data may be determined using a convolutional neural network (CNN) generator configured to map the OCT image scans to the unified representation.

In an embodiment, computer-implemented method 400 may also include one or more processors configured for determining 406, by a unified discriminator, third image data corresponding to a quality subset of the unified representation of the OCT image scans having a base resolution satisfying a first condition and a base noise type satisfying a second condition. In an embodiment, the first condition may be the base resolution exceeding a first predetermined threshold and the second condition is the base noise type being less than second predetermined threshold. In some embodiments, computer-implemented method 400 may include one or more processors configured for training the unified discriminator using unified space image data to generate high quality normalized OCT image scans. In some embodiments, OCT image scans may be generated by OCT devices each having one of one or more resolution values and one of one or more noise type values.

Computer-implemented method 400 may also include one or more processors configured for processing 408, by a conditional generator, the third image data to generate fourth image data corresponding to device-specific OCT image scans having a device-specific resolution satisfying a third condition and a device-specific noise type satisfying a fourth condition.

Computer-implemented method 400 may also include one or more processors configured for outputting 410 the fourth image data to a user interface of a computing device.

In some embodiments (not depicted), computer-implemented method 400 may include one or more processors configured for determining fifth image data corresponding a device-space subset of the device-specific OCT image scans having the device-specific resolution satisfying the third condition and the device-specific noise type satisfying the fourth condition. In an embodiment, the third condition may be the device-specific resolution being within a third predetermined threshold and the fourth condition may be the device-specific noise type is within a fourth predetermined threshold.

In an embodiment, the computer-implemented method may include one or more processors configured for training the unified discriminator using unified space image data to generate high quality normalized OCT image scans, wherein a high quality normalized OCT image scan satisfies a first condition. In an embodiment, the first condition may be the base resolution exceeding a first predetermined threshold and the second condition is the base noise type being less than second predetermined threshold.

In an embodiment, the third condition may be the device-specific resolution being within a third predetermined threshold and the fourth condition may be the device-specific noise type is within a fourth predetermined threshold.

Figure 5:
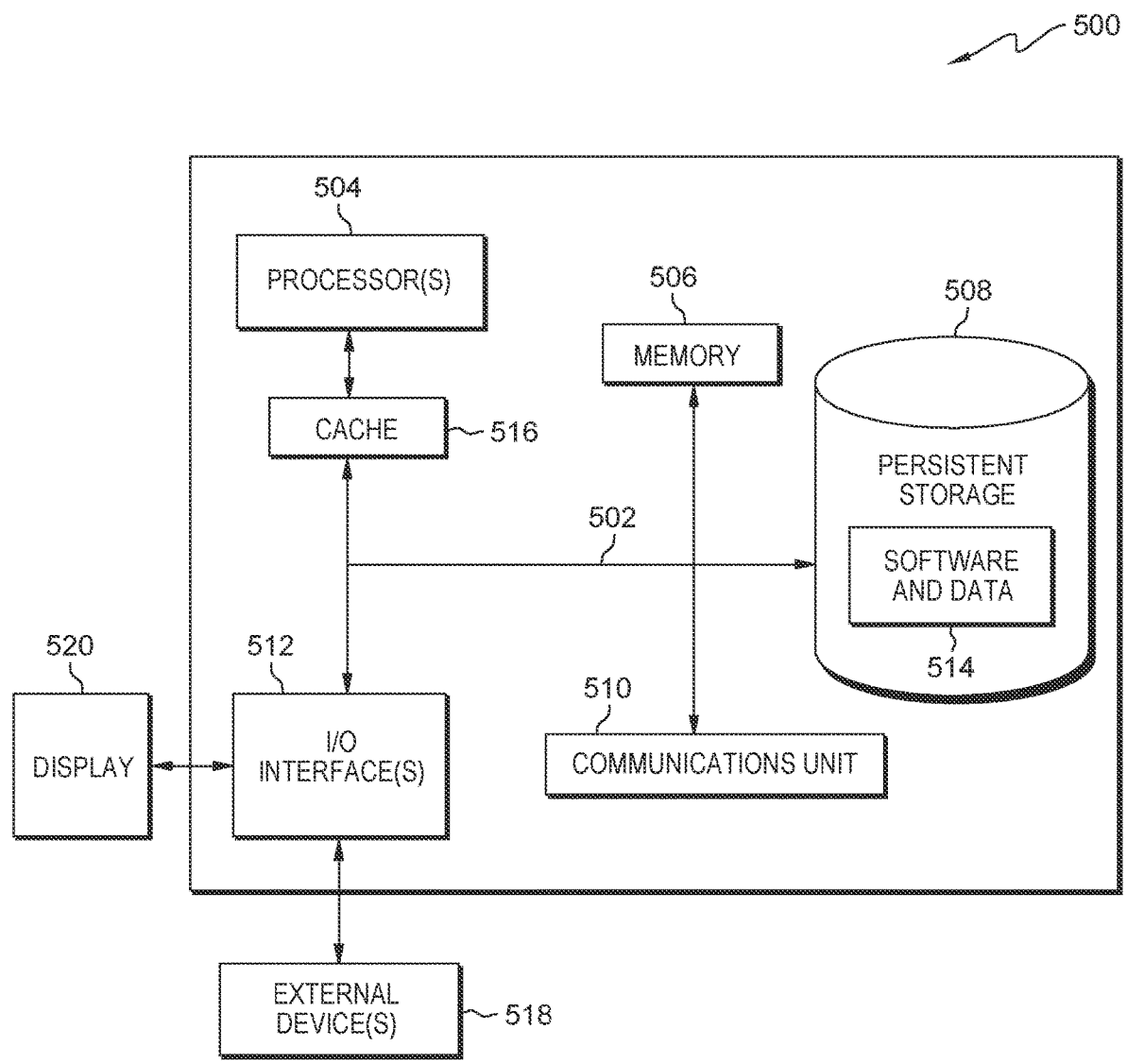
FIG. 5 depicts a block diagram of a computing device of the system of FIG. 1, in accordance with an embodiment of the present invention.

FIG. 5 depicts a block diagram of a computing device of system 100, in accordance with an embodiment of the present invention. FIG. 5 depicts a block diagram of computing device 500 suitable for computing device 120 running GAN 101, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computing device 500 includes communications fabric 502, which provides communications between cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of computer processor(s) 504 by holding recently accessed data, and data near accessed data, from memory 506.

Programs may be stored in persistent storage 508 and in memory 506 for execution and/or access by one or more of the respective computer processors 504 via cache 516. In an embodiment, persistent storage 508 includes a magnetic hard disk drive. Alternatively, or in addition to a magnetic hard disk drive, persistent storage 508 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Programs, as described herein, may be downloaded to persistent storage 508 through communications unit 510.

I/O interface(s) 512 allows for input and output of data with other devices that may be connected to computing device 500. For example, I/O interface 512 may provide a connection to external devices 518 such as image sensor, a keyboard, a keypad, a touch screen, and/or some other suitable input device. External devices 518 can also include portable computer readable storage media such as, for example, thumb drives, portable optical or magnetic disks, and memory cards. Software and data 514 used to practice embodiments of the present invention can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

Software and data 514 described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for generating device-specific optical coherence tomography (OCT) image data, comprising:
   receiving, by one or more processors, at a unified domain generator, first image data corresponding to OCT image scans captured by one or more OCT devices;
   processing, by the one or more processors, by the unified domain generator, the first image data to generate second image data corresponding to a unified representation of the OCT image scans;
   determining, by the one or more processors, by a unified discriminator, third image data corresponding to a quality subset of the unified representation of the OCT image scans having a base resolution satisfying a first condition and a base noise type satisfying a second condition;
   processing, by the one or more processors, using a conditional generator, the third image data to generate fourth image data corresponding to device-specific OCT image scans having a device-specific resolution satisfying a third condition and a device-specific noise type satisfying a fourth condition; and
   outputting the fourth image data to a user interface of a computing device.

2. The computer-implemented method of claim 1, wherein the second image data is determined using a convolutional neural network (CNN) generator configured to map the OCT image scans to the unified representation.

3. The computer-implemented method of claim 1, wherein the OCT image scans are each generated by one of the one or more OCT devices each having respective resolution values and respective noise type values.

4. The computer-implemented method of claim 1, wherein the first condition is the base resolution exceeding a first predetermined threshold and the second condition is the base noise type being less than second predetermined threshold.

5. The computer-implemented method of claim 1, further comprising:
   determining, by the one or more processors, by a device discriminator, fifth image data corresponding to a device-space subset of the device specific OCT image scans having the device-specific resolution and the device-specific noise type.

6. The computer-implemented method of claim 1, wherein the third condition is the device-specific resolution being within a third predetermined threshold and wherein the fourth condition is the device-specific noise type being within a fourth predetermined threshold.

7. The computer-implemented method of claim 1, further comprising:
   training, by the one or more processors, the unified discriminator, using unified space image data to generate high quality normalized OCT image scans.

8. A computer program product for generating device-specific OCT image data, the computer program product comprising:
   one or more computer readable storage medium and program instructions stored on the one or more computer readable storage medium, the program instructions comprising:
      program instructions to receive, at a unified domain generator, first image data corresponding to OCT image scans captured by one or more OCT devices;
      program instructions to process, by the unified domain generator, the first image data to generate second image data corresponding to a unified representation of the OCT image scans;
      program instructions to determine, by a unified discriminator, third image data corresponding to a quality subset of the unified representation of the OCT image scans having a base resolution satisfying a first condition and a base noise type satisfying a second condition;
      program instructions to process, using a conditional generator, the third image data to generate fourth image data corresponding to device-specific OCT image scans having a device-specific resolution satisfying a third condition and a device-specific noise type satisfying a fourth condition; and
      outputting the fourth image data to a user interface of a computing device.

9. The computer program product of claim 8, wherein the second image data is determined using a convolutional neural network (CNN) generator configured to map the OCT image scans to the unified representation.

10. The computer program product of claim 8, wherein the OCT image scans are each generated by one of the one or more OCT devices each having respective resolution values and respective noise type values.

11. The computer program product of claim 8, wherein the first condition is the base resolution exceeding a first predetermined threshold and the second condition is the base noise type being less than second predetermined threshold.

12. The computer program product of claim 8, further comprising:
   program instructions to determine, by a device discriminator, fifth image data corresponding to a device-space subset of the device specific OCT image scans having the device-specific resolution and the device-specific noise type.

13. The computer program product of claim 8, wherein the third condition is the device-specific resolution within a third predetermined threshold and wherein the fourth condition is the device-specific noise type within a fourth predetermined threshold.

14. The computer program product of claim 8, further comprising:
   program instructions to train the unified discriminator, using unified space image data to generate high quality normalized OCT image scans.

15. A computer system for generating device-specific OCT image data, the computer system comprising:
   one or more computer processors;
   one or more computer readable storage media;
   program instructions stored on the one or more computer readable storage media for execution by at least one of the one or more processors, the program instructions comprising:
      program instructions to receive, at a unified domain generator, first image data corresponding to OCT image scans captured by one or more OCT devices;
      program instructions to process, by the unified domain generator, the first image data to generate second image data corresponding to a unified representation of the OCT image scans;
      program instructions to determine, by a unified discriminator, third image data corresponding to a quality subset of the unified representation of the OCT image scans having a base resolution satisfying a first condition and a base noise type satisfying a second condition;

program instructions to process, using a conditional generator, the third image data to generate fourth image data corresponding to device-specific OCT image scans having a device-specific resolution satisfying a third condition and a device-specific noise type satisfying a fourth condition; and program instructions to output the fourth image data to a user interface of a computing device.

16. The computer system of claim 15, wherein the second image data is determined using a convolutional neural network (CNN) generator configured to map the OCT image scans to the unified representation.

17. The computer system of claim 16, further comprising:

program instructions to determine, by a device discriminator, fifth image data corresponding to a device-space subset of the device specific OCT image scans having the device-specific resolution and the device-specific noise type.

18. The computer system of claim 15, wherein the OCT image scans are each generated by one of the one or more OCT devices each having respective resolution values and respective noise type values.

19. The computer system of claim 15, wherein the first condition is the base resolution exceeding a first predetermined threshold and the second condition is the base noise type being less than second predetermined threshold; and wherein the third condition is the device-specific resolution within a third predetermined threshold; and wherein the fourth condition is the device-specific noise type within a fourth predetermined threshold.

20. The computer system of claim 15, further comprising:

program instructions to train the unified discriminator, using unified space image data to generate high quality normalized OCT image scans.

* * * * *